March 5, 1963  H. O. J. BENOIT  3,080,469
WIRE STRIPPING TOOL
Filed July 7, 1960
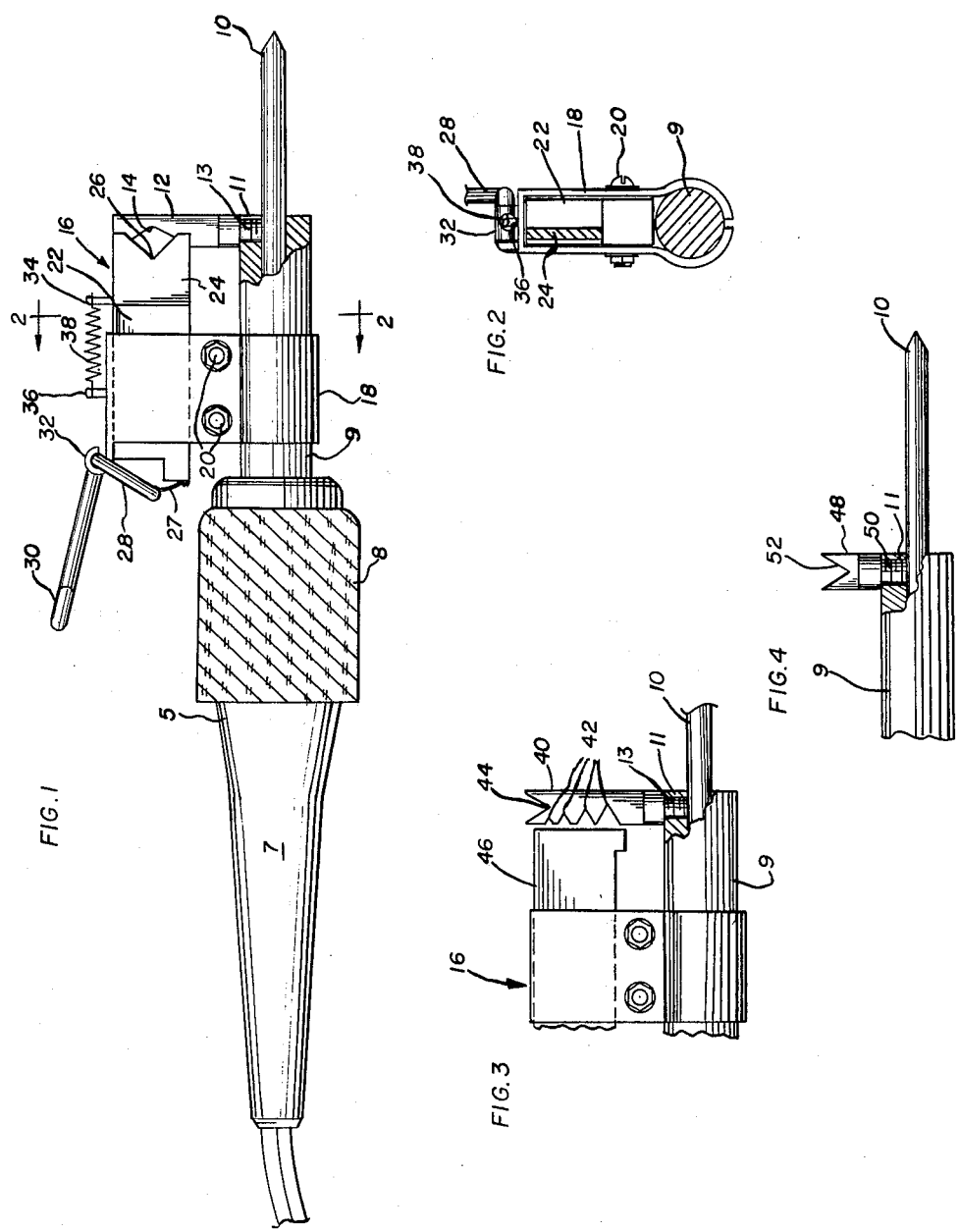
INVENTOR.
HORACE O. J. BENOIT
BY
ATTORNEY

United States Patent Office 3,080,469
Patented Mar. 5, 1963

3,080,469
WIRE STRIPPING TOOL
Horace O. J. Benoit, 24 S. Kingsley Drive,
Los Angeles, Calif.
Filed July 7, 1960, Ser. No. 41,440
6 Claims. (Cl. 219—29)

This invention relates to a wire stripper and more particularly to a heated wire stripping tool which can readily be combined with a soldering iron or built into a soldering iron to form a combination soldering iron and wire stripping tool, for the purpose of stripping thermoplastic insulation from electrical wire.

With the use of plastic insulations on electrical wire it has been found, in order to strip insulation from the wire, to be more desirable to sever a band around the insulation and to melt the insulation rather than to cut the insulation with a knife or other tool thus avoiding damage to the wire itself.

In present day assembly practices, it is frequently necessary, while working on a wiring job, that the operator in going from step to step in electrical assembly, use both a soldering iron and a wire insulation stripper. Thus two separate tools must be readily available for use. This is time consuming, tires the operator and often in changing tools, causes damage to the wire and often results in errors in soldering.

One object of this invention is to provide a heated wire stripping hand tool which is made either integral with a soldering iron as a combination tool or can be made as a separate unit and be attached to a soldering iron, and which can then become a combination soldering iron and wire stripper.

Another object of this invention is to provide a combination soldering iron and wire stripping hand tool which can be held in the operator's hand and the severing and the stripping of the insulation from the wire be accomplished by the use of the one hand holding the tool.

Briefly described, this invention embodies a heated wire insulation stripper provided with threads on one end thereof, adapted to replace the conventional set screw used for retaining the soldering tip in the electrical resistance heater element. A finger actuated "back up," adapted for mounting on or made integral with the heater element of the soldering iron, is provided to support the wire during the melting or circumferential severing of the insulation and also serves the purpose of gripping the insulation during its stripping from the wire.

Other objects and advantages of this invention will become apparent as the discussion proceeds and when considered in connection with the accompanying claims and drawings in which:

FIGURE 1 shows a plan view partially in section of a conventional soldering iron with one form of stripper embodying my invention mounted on the iron;

FIGURE 2 shows a sectional view taken along the line 2—2 of FIGURE 1;

FIGURE 3 shows an enlarged plan view partially in section of a modified form of the heated wire stripper embodying my invention; and FIGURE 4 shows another modification of a simplified heated wire stripping head combined with the soldering tip and heater element to form a combination soldering iron and wire stripping hand tool.

Turning now to a more detailed description of my invention, the numeral 5 designates generally a conventional hand soldering iron and which has a customary handle 7, preferably provided with a cork or insulated guard 8 located adjacent a resistance element 9 into which a soldering tip 10 is inserted. All of this is conventional and is well known in the art. As it forms no portion of this invention, it is deemed unnecessary to require additional detailed description. The tip 10 is held in place by means of an Allen set screw, located at hole 11.

In FIGURE 1, illustrating the preferred embodiment of my invention, the conventional Allen set screw inserted in hole 11 is replaced by a heated insulation severing head 12, which is provided with a screw thread 13 on one end thereof formed integral with the head 12. A V notch 14 is provided in the head 12, as shown, to form one jaw of a pair of jaws.

A finger actuated unit designated generally by the numeral 16 comprises a U-shaped clamping member 18 which, in the preferred embodiment of my invention shown in FIGURE 1, is held in place on the resistance element 9 by means of a pair of bolts 20. Inserted into the upper body portion of the U-shaped clamp 18 is a reciprocating plunger or bar 22. On the end of reciprocating bar 22 is a jaw 24, which is provided with a V notch 26 complementary to and which coacts with the V notch 14 of the heated insulation severing head 12. On the opposite end of reciprocating plunger 22, is provided a spring 26, which is securely attached at one end to the reciprocating plunger 22 and the other end of spring 26 is connected, in any suitable manner, to a finger pressed actuating lever 28. Preferably, a thumb rest 30 is provided on the opposite end of lever 28. At the top portion of the U-shaped clamping member 18 there is provided a bearing member 32, on which the actuating lever 28 is pivotally supported. Also mounted on the reciprocating plunger 22 is a pin 34. A complementary pin 36 is also provided on the upper surface of the U-shaped clamping member 18 as shown in both FIGURES 1 and 2. Connecting the two pins 34 and 36 is a spring 38, which returns the plunger 22 to its inoperative position.

The operation of the embodiment of my invention illustrated in FIGURES 1 and 2 is as follows: The U-shaped clamping member 18 is mounted on the resistance heating element 9 and is held in place thereby by screws 20, as best shown in FIGURE 2. The entire finger actuated unit 16 is aligned on the resistance heating element 9 so that the jaw 24 is so positioned as to slidingly co-act with the jaw 12, as illustrated in FIGURE 1. The actuating lever 22 when pressed downward by means of the thumb or forefinger placed on the thumb rest 30 causes the reciprocating plunger 22, together with the jaw 24 to move toward the heated severing jaw 12. When the actuating lever 28 is depressed and the reciprocating jaw 22 is moved toward the jaw 12, the opening formed by the V notches 14 and 26 is closed around the insulated wire, which is first inserted through this opening. At this step the wire preferably should be rotated in this V notch opening in both jaws just slightly to completely melt away the entire insulating material touching the notches 14 and 26. After a very slight pause in this turning action, the plastic wire insulation is then completely melted in a band down to the wire and the wire is then gently pulled sideways of the stripping tool until the end of the insulation is cleanly and simply stripped away from the wire, after which operation the soldering tip can, without replacing or picking up another tool, be used to complete the desired soldering operation.

It is to be noted that the inner faces of the V notches 14 and 26 should be blunted, in order to avoid unintentionally nicking or cutting the wire surface. As an additional guard against excessive pressure on the wire thus weakening it, the spring 27 is provided between the reciprocating plunger 22 and the lever 28. This spring 27 permits the notches 14 and 26 to partly close, but does not allow them to close tight enough against the wire to cause any damage thereto. In this connection it is to be understood that if desired various forms of limit stops could be used, such as a plurality of elongated slots provided in the sides 18 of the support 16 and holes in the reciprocating plunger 22 into which a pin or pins could be inserted, thus providing stops for various size wires. However, it has been this inventor's experience that the operators of wire stripping tools are careless and reluctant to change the setting of wire stripping tools when various dimension wires are being stripped therefore, such a positive guard against damage to the wire has been found to be less desirable than the spring 37.

Turning now to a detailed description of the modification of my invention embodied in the form shown in FIGURE 3, the conventional soldering iron is partially shown with the resistance heating element 9 and the soldering tip 10 broken away and in portion only. The heated severing head and jaw 12, in this embodiment, is replaced by a modified form of heated severing head and jaw designated generally by the numeral 40. This head, it will be seen from studying the drawing in FIGURE 3, in place of being provided with a single V-shaped notch 14, is provided with a plurality of V notches 42. Each V notch 42, as illustrated, is provided with a different width opening and of a different depth to accommodate different size wires. In addition to the V notches 42, as shown, there is also provided a single V notch 44. This purpose of the V notch 44 can best be understood by referring to the modification illustrated in FIGURE 4 and will be explained in detail in connection with the explanation of the modification relating to FIGURE 4.

The finger actuated unit designated generally by the numeral 16 of the form shown in FIGURE 1 is identical to that shown in FIGURE 3. The only change being made is the particular shape and positioning of the jaw 24. The jaw of the modification shown in FIGURE 3 is designated by the numeral 46. In place of having the V notch 26 provide therein and in place of reciprocating in sliding contact with the heated head element 40 comes to abutment against the edge thereof and thus automatically prevents damage to the wire during the severing of the insulation. This safety feature of the tongue 46 makes it necessary to provide various size V notches 42 to accommodate different size wires. The single V notch 14 and the heated severing head 12 shown in FIGURE 1 makes a safer manner in stripping the wire, but requires more careful attention and sensitive technique upon the part of the operator and the use of one or the other types of actuating and stripping mechanism depends upon the particular circumstances for which the tool is to be used.

In the modification shown in FIGURE 4 there is illustrated a very simple combination soldering iron and heated wire stripping tool. This combination tool consists of the conventional resisting heating element 9 and a soldering tip 10. As in the embodiment shown in FIGURES 1 and 2, the conventional Allen screw is replaced by a means of a single heated severing head 48 on one end of which is provided threads 50. The threads 50 of the modified form of severing head 48 are screwed into the heated resistance element 9 in place of the conventional Allen screw and hold the soldering tip 10 in heating element 9 as in the embodiment shown in FIGURE 1. The heated severing head 48 is provided with a V notch 52 shown and illustrated here as a simple straight V notch. However, it is to be understood that the shape of this notch is not material to the scope of this invention and can be modified to contour or outline round wires or even flat wires as desired. In this same connection, attention is invited to the modification shown in FIGURE 3 and the V notch 44 of this modification which is for the same identical purpose as V notch 52 of the embodiment shown in FIGURE 4.

The operation of the combination soldering iron and heated wire stripper shown in FIGURE 4 is simply that the V notch 52 being turned parallel to the soldering iron tip 10 as well as the resistance heating element 9, a wire is simply placed in the notch 52 and is rotated 180° in this notch and then the insulation is stripped off the wire by pulling the wire sideways through the V. While it is convenient to hold the wire in the notch 52 with the thumb, which of course is provided with a heat insulation material such as asbestos or the like, it also has been found convenient to provide a simple metal or ceramic block with grooves therein and with a cross notch of a size into which the tip 48 and the V notch 52 can fit over a wire and the inserted end of the notch. (None of the block is shown as it forms no part of this invention.) The notch 44 of the heated severing head shown in FIGURE 3 operates in the same manner and is provided in case it is desired to strip a wire of a size not provided for in the notches 42 shown in FIGURE 3.

The embodiment of my invention illustrated in FIGURE 4 provides a very simple and inexpensive combination wire stripper and soldering iron. It is deemed appropriate to point out here that the heat for the heated severing heads or jaws 12, 40 and 48 is conducted from the resistance heating element 9 in exactly the same manner as the heat is conducted to the conventional soldering tip 10.

It is to be understood that various changes in shape and material can be resorted to without departing from the spirit of my invention as set forth in the appended claims.

I claim:
1. A combination heated wire stripping tool and soldering iron comprising a handle, an electrical resistance heating element in said handle, a soldering tip in said resistance element, a heated wire stripping element forming a stationary jaw mounted on said resistance element, a reciprocating jaw mounted on said resistance element positioned to co-act with said wire stripping element, actuating means mounted on said resistance element associated with said reciprocating jaw for moving the latter jaw toward said stationary jaw and resilient means associated with said actuating means limiting the extent of travel of said reciprocating jaw toward said stationary jaw thereby preventing damage to the wire being stripped.

2. A combination heated wire stripping tool and soldering iron comprising a handle, an electrical resistance heating element in said handle, a soldering tip in said resistance element, a heated wire stripping element forming a stationary jaw mounted on said resistance element, a bracket mounted on said resistance element, a reciprocating bar in said bracket, a reciprocating jaw on said bar aligned for sliding co-action with said heated wire stripping element, an operating lever associated with said reciprocating bar for moving said reciprocating jaw toward the stationary jaw on said bracket and resilient means interposed between and connecting said lever to said reciprocating bar adapted to actuatingly connect said operating lever and said bar and also limit the extent to which said jaws are closed around the wire being stripped.

3. A heated wire stripping tool comprising a heated wire stripping element forming a stationary jaw, a reciprocating jaw positioned to co-act with said wire stripping element, actuating means associated with said reciprocating jaw for moving the latter toward said stationary jaw, resilient means interposed between and connecting said actuating means to said reciprocating jaw limiting the extent of travel of said reciprocating jaw toward said stationary jaw, and means for mounting said stripping element on a heating element of a soldering iron.

4. A heated wire stripping tool comprising a heated wire stripping element forming a stationary jaw, a reciprocating jaw positioned to co-act with said wire stripping element, actuating means associated with said reciprocating jaw for moving the latter toward said stationary jaw, resilient means interposed between one end of said reciprocating jaw and said actuating means limiting the extent of travel of said reciprocating jaw toward said stationary jaw, and means for mounting said stripping element on a heating element of a soldering iron.

5. A heated wire stripping tool comprising a heated wire stripping element forming a stationary jaw, a supporting bracket, a reciprocating bar in said bracket, a reciprocating jaw on said bar aligned for sliding co-action with said heated wire stripping element, an operating lever associated with said reciprocating jaw for moving the latter toward said stationary jaw on said bracket and resilient means interposed between and connecting said lever to said reciprocating bar adapted to limit the extent to which said jaws are closed around the wire being stripped, said tool being adapted to be mounted on the resistance heating element of a soldering iron to form a combination heated wire stripper and soldering iron tool.

6. A combination heated wire stripping tool and soldering iron comprising a handle, an electric resistance heating element in said handle, a soldering tip in said resistance element, a heated wire stripping element having a plurality of different sized V notches therein, a slideable reciprocating jaw mounted on said resistance heating element positioned to co-act with said wire stripping element and actuating means mounted on said resistance element being associated with said reciprocating jaw for moving the latter jaw toward said heated wire stripping element having a plurality of notches therein.

References Cited in the file of this patent

UNITED STATES PATENTS

| | | |
|---|---|---|
| 1,595,799 | Massingham | Aug. 10, 1926 |
| 2,620,692 | Marshall | Dec. 9, 1952 |
| 2,763,170 | Karem | Sept. 18, 1956 |
| 2,995,052 | Funcik | Aug. 8, 1961 |

FOREIGN PATENTS

| | | |
|---|---|---|
| 557,307 | Great Britain | Nov. 15, 1943 |
| 581,618 | Great Britain | Oct. 18, 1946 |
| 611,822 | Great Britain | Nov. 4, 1948 |
| 920,918 | Germany | Dec. 2, 1954 |